Patented Nov. 12, 1946

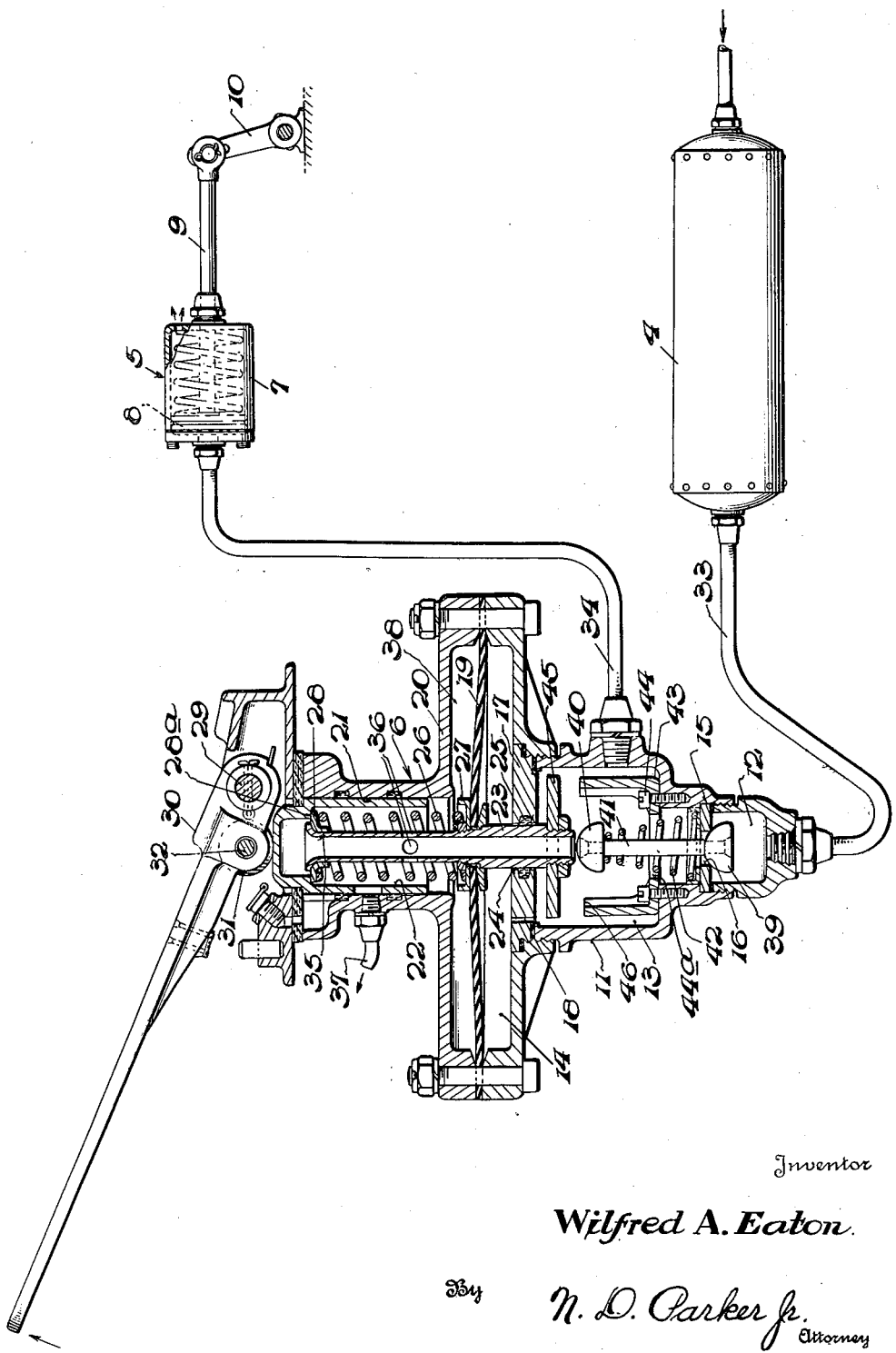
Inventor
Wilfred A. Eaton.
By N. D. Parker Jr.
Attorney

2,410,966

UNITED STATES PATENT OFFICE 2,410,966

BRAKE MECHANISM

Wilfred A. Eaton, Elyria, Ohio, assignor to Bendix-Westinghouse Automotive Air Brake Company, Elyria, Ohio, a corporation of Delaware Application April 29, 1943, Serial No. 485,054

8 Claims. (Cl. 303—54)

This invention relates to control mechanisms and more particularly to remotely controlled fluid pressure operated mechanisms especially adaptable for use in connection with motor vehicles.

It has heretofore been proposed to employ fluid pressure operated, remotely controlled mechanism for controlling and actuating various of the control elements of automotive vehicles, and apparatus of this character is especially suitable and adaptable to motor vehicles of the type wherein the elements to be controlled are positioned at a considerable distance from the operator of the vehicle. Difficulty has been experienced in many of the mechanisms previously proposed, however, in view of the fact that the time required to supply the required degree of fluid pressure to the remotely positioned actuator has been excessive, and it is accordingly one of the objects of the present invention to provide means for overcoming this difficulty.

A further object of the invention is to provide a control valve mechanism so constituted as to permit a substantially unrestricted connection between the source of fluid pressure and the actuator during substantially the entire period during which the source and actuator are connected by the operation of the control valve mechanism.

Yet another object of the invention is to provide, in a self-lapping control valve mechanism, means for preventing lapping action of the valve from occurring until the pressure in the actuator is substantially that for which the valve has been adjusted by the operator.

A still further object of the invention is to provide control valve mechanism of the so-called self-lapping and graduating type, so constituted as to permit the establishment of a substantially unrestricted connection between the source of fluid pressure and the actuator without in any way interfering with the operation of the self-lapping and graduating features of the valve when the operation of the system requires the satisfactory and normal operation of these features.

These and other objects and novel features of the invention will appear more fully hereinafter from the following detailed description when taken in connection with the accompanying drawing. It is to be expressly understood, however, that the drawing is forwarded for purpose of illustration only, and is not designed as a definition of the limits of the invention, reference being had for this purpose to the appended claims.

In the drawing, a fluid pressure control system embodying the features of the present invention is illustrated as including a fluid pressure reservoir 4, a fluid pressure actuator indicated generally as 5, and a control valve mechanism 6 of the so-called self-lapping graduating type, which is preferably constructed in accordance with the principles set forth in the patent to W. J. Andres, and R. S. Sanford No. 2,133,275, dated October 18, 1938. The actuator 5 is provided with a cylinder 7 and a piston 8 slidably mounted therein, the piston being provided with a piston rod 9 adapted to impart motion from the piston to a vehicle controlling element 10.

The control valve mechanism 6 is provided with a casing 11 provided with an inlet chamber 12, an outlet chamber 13 and a diaphragm chamber 14, the inlet and outlet chambers being separated by means of a partition 15 provided with a port 16 therein, and the outlet chamber being separated from the diaphragm chamber by means of a partition 17, the only connection between the latter chambers being through the medium of a restricted passage or choke 18. The upper end of the chamber 14 is closed by means of a pressure responsive member or diaphragm 19 clamped between the upper end of the casing 11 and a closure member 20 suitably bolted thereto, the upper portion of the closure member 20 being provided with a bore 21 and an operator-controlled plunger 22 slidably mounted therein. A valve operating element 23 is slidably mounted in a bore 24 formed in partition 17, the valve operating element being attached to the pressure responsive member 19 at its center, as shown, for movement therewith, a sealing device 25 positioned in the bore 24 serving to prevent communication between the outlet chamber 13 and the diaphragm chamber 14 between the outer surface of the element 23 and the surface of the bore 24. The valve operating element 23 is thus positioned by means of the bore 24 and the pressure responsive member 19, and is adapted to be operated by movement of the plunger 22 through the medium of a graduating spring 26 interposed between the upper face of a washer 27 mounted on the element and a washer 28 slidably mounted at the upper end of the valve operating element and adapted to engage a shoulder 28a formed on the plunger. In order that the plunger 22 may be readily controlled by the vehicle operator, the closure member 20 is provided at its upper end with a suitable pivot pin 29 on which is pivotally mounted an operator's control pedal 30, the latter having a connection with the upper end of the plunger 22 through the medium of a roller 31 pivotally mounted on the pedal by means of a pivot pin 32.

In order that the valve mechanism may operate to control the flow of fluid pressure from the reservoir 4 to the actuator 5 and from the actuator 5 to atmosphere, the inlet chamber 12 is connected with the reservoir through the medium of conduit 33, while the outlet chamber 13 is connected with the actuator through the medium of a conduit 34, the outlet chamber in turn being connected with atmosphere through the medium of a bore 35 formed in the element 23, a port 36 formed in the wall of said bore, and an exhaust outlet 37 which serves to connect with atmosphere a chamber 38 formed between the upper surface of the pressure responsive member 19 and the closure member 20. Communication between the chambers 12 and 13 through the port 16 is normally prevented by means of an inlet valve 39, an exhaust valve 40 connected thereto by means of a stem 41 being adapted to close the lower end of the bore 35 in the element 23 on downward movement of the latter. In order that the inlet valve may normally be maintained in closed position, a suitable spring 42 is interposed between the upper surface of the partition 15 and the lower face of the exhaust valve 40. Thus it will be apparent that with the parts in the positions shown, communication between reservoir 4 and the actuator 5 is prevented by means of normally closed inlet valve 39, while communication between the actuator and atmosphere is permitted through the conduit 34, outlet chamber 13, bore 35, port 36, chamber 38 and exhaust outlet 37, while on downward movement of the valve operating element 23, the lower end of the bore 35 first contacts the exhaust valve 40 to prevent communication between the outlet chamber and atmosphere, further movement opening the intake valve against the force exerted by the spring 42 to permit communication between conduits 33 and 34, thus allowing fluid pressure to be supplied from the reservoir to the actuator.

It will be understood from the foregoing, and on reference to the above referred to patent, that on downward movement of the operator's pedal 30, the graduating spring 26 will be compressed to exert a downward force on the valve operating element 23 to close the exhaust valve and open the intake valve, and that as the pressure builds up in the outlet chamber 13 and in the actuator 5, this pressure will also be supplied to the diaphragm chamber 14 through the restricted port 18, with the result that the upward force on the diaphragm due to the pressure in the chamber 14 will eventually overbalance the downward force exerted by the spring and permit the element 23 to move upward to a point where both the inlet and exhaust valves are in closed position, this being considered as the lapped position in the valve, as will be readily understood by those skilled in the art. It is to be pointed out, however, that on initial operation of the pedal 30 to adjust the valve mechanism to deliver a substantially high pressure to the actuator 5, the fluid in the chamber 14 will be substantially at atmospheric pressure, and consequently no pressure will initially be exerted on the member 19 to oppose downward movement of the valve actuating element, the result being that the inlet valve 39 will be moved to its fully open position, thus establishing a substantially unrestricted connection between the reservoir and the actuator. In valves of this general type, however, it is well known that during this type of operation, as the pressure in the outlet chamber approaches that for which the graduating spring has been adjusted, the upward pressure on the diaphragm increases, with the result that the valve actuating element moves upward to permit gradual closing of the inlet valve under the action of the valve spring 42, the connection between the conduits 33 and 34, gradually becoming more restricted until a point is reached where the passage between the inlet and outlet chambers is fully closed and further passage of fluid pressure is prevented.

This has resulted in a relatively slow application of fluid pressure to the actuator, and a consequent delayed operation of the actuator in the past, and the present invention contemplates, in connection with a control valve mechanism of the above type, the inclusion of means for maintaining the inlet valve in substantially wide open position until the pressure delivered to the actuator is substantially equal to that for which the graduating spring has been adjusted by the operator, and such means include, in the present instance, a permanent magnet 43, which may be of the horse shoe type, preferably mounted on the casing as shown by means of suitable screws 44 and provided with a bore 44a to provide clearance for the valve spring 42. The valve actuating element 23 is also provided with a suitable armature 45 of magnetic metal, which may be threadedly mounted on the lower end of the element as shown, the result being that on operation of the control pedal to move the valve actuating element 23 downward to move the inlet valve to fully open position, the armature 45 carried by the element approaches the poles 46 of the magnet, the armature when in contact with the upper end of the poles tending to adhere thereto and maintain the valve operating element in its downward position so that the intake valve is fully open to permit the unrestricted flow of fluid pressure between the inlet and outlet chambers, and thence to the actuator. It is desirable, however, that the valve be permitted to move to lapped position as soon as the pressure in the outlet chamber and in the actuator approaches that for which the graduating spring has been adjusted, and the magnet is accordingly so designed in connection with the armature as to provide a holding force which will be overcome by the fluid pressure acting on the diaphragm 19, when the force resulting from this pressure exceeds that exerted in a downward direction by the graduating spring by a small predetermined amount, the strength of the magnet being preferably so chosen as to exert a force somewhat on the order of the force necessary to compress the graduating spring by an amount necessary to permit the inlet valve to move from fully open to fully closed position. Thus with the inlet valve held in open position by means of the magnet as above described, and with the pressure building up in the outlet chamber of the valve and the chamber below the diaphragm 19, it will be understood that the pressure acting on the diaphragm can increase sufficiently to overcome the force exerted by the graduating spring and the force exerted by the magnet and start upward movement of the valve operating element to move the valve to closed position, and that if the force of the magnet is chosen as described, this additional force exerted on the diaphragm will be substantially dissipated, or, in other words, absorbed by compression of the graduating spring 26, with the result that there will be no tendency for the diaphragm to exert an over-controlling action on the element 23, with a resultant sequential closing of the inlet valve and opening of the exhaust valve to unnecessarily exhaust fluid pressure from the outlet chamber 13 and from the actuator 5. It will also be clearly understood that the magnet force chosen can be any desired amount less than that above described, and that under certain circumstances of operation, it may also be desirable to use a magnet exerting a larger force, it being understood that the foregoing description is merely illustrative of the preferred mode of operation. As soon as the force exerted in an upward direction by the diaphragm 19 exceeds the force exerted in a downward direction by the graduating spring 26 by an amount equal to or slightly greater than that exerted by the magnet, it will be readily understood that the element 23 will be moved rapidly upward under the action of the excess force accumulated in an upward direction by the fluid pressure force acting upward on the diaphragm, and that the valve spring 42 will then move the valve assembly upward to move the valve 39 to closed position and prevent further communication between the inlet and outlet chambers.

With reference to the mode of operation described in the preceding paragraph, this type of operation is particularly desirable under conditions such that the operator wishes to supply a predetermined degree of pressure to the actuator in the shortest possible period of time, but it is pointed out that when it is desired to so operate the control valve mechanism 6 as to establish small increments or decrements of pressure in the actuator 5, operation of the magnet to hold the intake valve in open position might seriously interfere with the sensitive operation of the valve, and the mechanism is therefore preferably constructed as above described, in such a manner that the magnet becomes effective only when the operator's control pedal is operated to move the intake valve to fully open position. In the event the operator has already adjusted the valve to provide a desired pressure in the actuator, and then desires to further depress the control pedal in order to obtain a slight increase of pressure in the actuator, it is to be understood that the corresponding pressure increase which will occur in the outlet chamber 13 and in the diaphragm chamber 14 will occur with sufficient rapidity to prevent the additional force exerted by the graduating spring from forcing the valve actuating element 23 and the armature 45 downward sufficiently to be attracted by the poles of the magnet, the result being that under this condition of operation the valve mechanism will have a mode of operation comparable with that of the ordinary and well known self-lapping graduating type control valve.

While the invention has been described and illustrated herein with considerable particularity, it is to be understood that the same is not limited to the form shown, but may receive a variety of mechanical expressions as will readily appear to those skilled in the art. Reference will, therefore, be had to the appended claims for a definition of the limits of the invention.

What is claimed is:

1. In a fluid pressure control valve of the self-lapping type having an inlet chamber, an outlet chamber, and a valve for controlling the connection between said chambers, a valve operating element for moving said valve in one direction to open the valve and establish a connection between said chambers, a member responsive to the pressure in the outlet chamber and associated with said element for moving the element in the other direction to permit closing of the valve, and means including a magnet cooperating with said valve operating element and effective when the latter is moved to valve-opening position for maintaining said element in said position, until the force exerted by the pressure responsive member to move the valve operating element to valve-closing position exceeds the force tending to move said valve operating element to valve-opening position by a predetermined amount.

2. The combination in a fluid pressure control valve mechanism having an inlet chamber, an outlet chamber, and a valve for controlling the flow of fluid between said chambers, of means for moving said valve to one position to permit the flow of fluid from said inlet chamber to said outlet chamber, means for moving said valve to a second position to prevent the flow fluid between said chambers, and means including a magnet for maintaining the valve in said one position in opposition to the action of said last named means.

3. The combination in a fluid pressure control valve mechanism having an inlet chamber, an outlet chamber and a valve for controlling the flow of fluid from said inlet chamber to said outlet chamber, of means for applying a force to the valve to move it to one position to establish communication between said chambers, means including a member responsive to the pressure in the outlet chamber for applying a force to said valve to move it to another position to prevent communication between said chambers, and means including a magnet effective on movement of said valve to said one position for maintaining the valve in said position until the force exerted by the second named means exceeds that exerted by the first named means by a predetermined value.

4. The combination in a fluid pressure control valve mechanism having a valve movable to open and closed positions for controlling the flow of fluid therethrough, of force applying means for moving the valve to open position, force applying means for moving the valve to closed position, and means including a magnet operable when the valve is in open position for maintaining the latter in said position until the force exerted by said second named means exceeds that exerted by the first named means by a predetermined amount.

5. The combination in a fluid pressure control valve mechanism having a casing provided with inlet and outlet chambers, a port between said chambers, and a valve movable for opening and closing said port, of a spring adjustable for exerting a force to move said valve to open position, means including a member responsive to the pressure in the outlet chamber for opposing the force exerted by said spring and moving the valve to closed position, and means including a magnet for holding said valve in open position, the holding force exerted by said magnet being substantially equal to the force required to compress the spring during movement of said valve from open to closed position in response to the force exerted by said pressure responsive member.

6. The combination in a self-lapping control valve mechanism having a pair of valves for controlling the flow of fluid pressure therethrough, means for normally maintaining one of said valves in open position and the other valve in closed position, and a valve operating element for moving said one valve to closed position and said other valve to open position, of means for applying a force to said element for moving said valves to one of said positions, means responsive to the pressure in said valve mechanism for applying a force to said element for moving the valves to said other position, and means including a magnet for holding said element and maintaining the valves in one of said positions when difference in the forces applied to said element by said force applying means is less than a predetermined value.

7. In a self-lapping valve of the type having an outlet chamber adapted to be connected with an actuated device, inlet and outlet valves for controlling the flow of fluid pressure to and from said chamber, means including a pressure-responsive element adapted to be subjected to the pressure of the fluid in the outlet chamber for controlling the opening, lapping and exhaust movements of said valves, and means including a magnet for preventing lapping of said valves until the pressure in the outlet chamber exceeds a predetermined value, said means permitting unrestricted movement of said element to effect lapping of said valves when said pressure exceeds said predetermined value.

8. In a control valve mechanism having a casing provided with an inlet chamber, an outlet chamber, a port connecting said chambers, and a valve for normally closing said port, means including a graduating spring for moving said valve in one direction to fully open position, means including a member responsive to the pressure in the outlet chamber for opposing the operation of the moving means and moving the valve in the opposite direction to closed position, and means including a part supported by the pressure responsive member and a part supported by the casing, and arranged to contact with each other only when the valve is moved to substantially fully open position, said parts being so constructed and arranged as to hold the valve in fully open position until the force exerted by the pressure responsive member to close the valve exceeds the force exerted by the moving means to open the valve by a predetermined value.

WILFRED A. EATON.